(12) United States Patent
Jaffrey

(10) Patent No.: US 6,444,340 B1
(45) Date of Patent: Sep. 3, 2002

(54) ELECTRICAL CONDUCTIVITY IN A FUEL CELL ASSEMBLY

(75) Inventor: Donald Jaffrey, Mount Dandenong (AU)

(73) Assignee: Ceramic Fuel Cells Limited, Melbourne (AU)

(*) Notice: Subject to any disclaimer, the term of this patent is extended or adjusted under 35 U.S.C. 154(b) by 0 days.

(21) Appl. No.: 09/486,501

(22) PCT Filed: Sep. 4, 1998

(86) PCT No.: PCT/AU98/00719
§ 371 (c)(1),
(2), (4) Date: May 30, 2000

(87) PCT Pub. No.: WO99/13522
PCT Pub. Date: Mar. 17, 1999

(30) Foreign Application Priority Data

Sep. 5, 1997 (AU) .............................................. PO8978

(51) Int. Cl.[7] .............................. H01M 8/10; H01M 8/24
(52) U.S. Cl. .............................. 429/30; 429/32; 429/34
(58) Field of Search .............................. 429/30, 32, 33, 429/34

(56) References Cited

U.S. PATENT DOCUMENTS

| | | | |
|---|---|---|---|
| 5,064,734 A | 11/1991 | Nazmy | 429/33 |
| 5,069,987 A | * 12/1991 | Gordon | 429/34 X |
| 5,273,837 A | * 12/1993 | Aitken et al. | 429/30 |
| 5,462,817 A | * 10/1995 | Hsu | 429/30 X |
| 5,856,035 A | * 1/1999 | Khandkar et al. | 429/32 |

FOREIGN PATENT DOCUMENTS

| | | |
|---|---|---|
| JP | 4079163 A | 3/1992 |
| JP | 6223846 A | 8/1994 |
| WO | 96/28855 | 9/1996 |
| WO | 97/35349 | 9/1997 |

* cited by examiner

Primary Examiner—Stephen Kalafut
(74) Attorney, Agent, or Firm—Dorsey & Whitney LLP

(57) ABSTRACT

A solid oxide fuel cell assembly has a gas separator plate and a silver electrically conducting layer between the gas separator plate and the cathode layer of the adjacent fuel cell. The conductive layer may be in the form of a mesh or other sheet which permits oxygen-containing gas in gas channels to pass through the conductive layer and access to the cathode layer. The silver may be pure, alloyed, present as an intermetallic compound, or present as a composite with a non-metal.

20 Claims, 5 Drawing Sheets

ELECTRICAL CONDUCTIVITY IN A FUEL CELL ASSEMBLY

The present invention relates to a solid oxide fuel cell assembly comprising one or more planar fuel cells and is particularly concerned with collecting electricity in such an assembly.

The current design of solid oxide planar fuel cell assemblies requires that the electric current generated in the electrolyte of a fuel cell be conducted away by a gas separator between adjacent fuel cells known as an interconnect. The gas separator must also be a good thermal conductor to conduct heat generated in the fuel cell away from the fuel cell. In some designs the interconnect is manufactured from a ceramic material which is electrically conducting at the operating temperatures while in other designs the interconnect is manufactured from a metallic material which is also a current carrier. Whatever the material of construction of the interconnects, it is essential that it be a good current carrier at the operating temperature and that the interfaces between the interconnect and the electrolyte also be conducting, i.e. the interconnect—cathode layer interface and the interconnect—anode layer interface. These requirements have proved to be difficult ones to meet in practical fuel cell designs without some compromises of the other properties.

It has proved difficult to avoid the various materials of the fuel cell assembly and the interfaces between them degrading or changing substantially during the life of the fuel cell, in so far their electrical conductivity is affected, because of the tendency of dissimilar materials to interact at the high temperatures which are required for efficient operation of a solid oxide fuel cell. For example, most metallic interconnects contain substantial quantities of the element chromium which is used to impart oxidation resistance to the metal as well as other properties. It has been found that where chromium is present in more than minute quantities it may combine with oxygen to form highly volatile oxide or oxyhydroxide gases under conditions which are typical of those experienced in operating solid oxide fuel cells. These volatile gases are attracted to the cathode-electrolyte interface where they may react to form compounds which are deleterious to the efficiency of the fuel cell. If these chromium reactions are not eliminated or substantially inhibited, the performance of the fuel cell deteriorates with time to the point where the cell is no longer effective. Eliminating these reactions while at the same time maintaining the current carrying efficiency of the interconnect is a difficulty faced by most or all of the high temperature planar solid oxide fuel cell designs in use today.

One proposal for alleviating this problem is described in our Patent Application WO96/28855 in which a chromium-containing interconnect plate is provided with an oxide surface layer which reacts with the chromium to form a spinel layer between the substrate and the oxide surface layer and thereby tie in the chromium.

A further requirement of current fuel cell designs is the need for a good current flowpath across the cathode side interface of the fuel cell assembly, i.e. good electrical contact. In existing designs this is accomplished to a greater or lesser degree by holding two approximately flat surfaces together under load, thus ensuring a large number of very fine point contacts which act as electrical bridges between the fuel cell cathode layer and the interconnect plate. This requirement for flat or well matched surfaces is difficult to achieve in practical fuel cells without recourse to expensive and tightly controlled machining or surface preparation methods. Holding these surfaces together as the temperature in the fuel cell rises or falls is also difficult since the thermal expansion characteristics are very difficult to match perfectly with the various materials of construction.

The present invention aims to alleviate the above difficulties of existing designs by separating the current collecting requirement of the gas separator at the cathode-gas separator interface from the other functions of the gas separator, and meeting the electrical conduction requirement in a separate component.

It has been proposed in patent publication JP 6223846-A to provide a current collecting board composed of a porous electrically conductive perovskite oxide between the cathode of a fuel cell and a gas separator in order to achieve the joint aims of providing a current flow path while still allowing oxygen access to the cathode. However, such oxides are relatively expensive, not very robust physically and, because of their brittle nature, require a close matching of mating surfaces to provide satisfactory electrical contact.

According to the present invention there is provided a solid oxide fuel cell assembly comprising a planar fuel cell having a solid oxide electrolyte layer with an anode layer on one side and a cathode layer on the other side, the fuel cell being disposed between a first thermally conductive heat resisting metal alloy gas separator member adjacent the cathode layer and a second thermally conductive heat resisting metal alloy gas separator member adjacent the anode layer, oxygen containing gas passages being provided between the cathode layer and the first gas separator member and fuel gas passages being provided between the anode layer and the second gas separator member, wherein a layer of electrically conductive material is provided between the cathode layer and the first gas separator member in electrical contact with the cathode layer to conduct electrical current away from the cathode layer, said electrically conductive layer being adapted to permit the oxygen-containing gas in the oxygen-containing gas passages to contact the cathode layer and comprising silver, and wherein the first gas separator member has a layer of alumina adjacent the layer of electrically conductive material.

By the invention, the electrical current is conducted away from the fuel cell via an electrically conductive layer comprising silver positioned between the alumina layer on the first gas separator member and the cathode layer of the fuel cell. We have surprisingly found that notwithstanding the relatively low melting temperature of silver, the electrically conducting layer can continue to provide efficient current collection over extended periods even at the elevated operating temperatures of high temperature solid oxide fuel cells.

The silver may be alloyed with one or more other noble metals and/or with one or more non-noble metals or may be present as in intermetallic compound or as a composite material with a non-metal in which case the silver is preferably present as a major component of the alloy, compound or material, for example at least about 50 wt % and the other component(s) should not contaminate the fuel cell. However, the electrically conductive layer advantageously comprises silver at least substantially alone as it is relatively inexpensive, freely available in the pure form, easy to melt and fabricate, non-toxic, and excellent conductor of heat and electricity, and malleable.

By providing the conductive layer comprising silver between the cathode layer and the alumina layer on the first gas separator member, the conductive layer may be able to selectively distort or comply under typical loads applied during use and thereby permit the use of fuel cell assembly components which are not highly flat, parallel, smooth or accurate. Such compliance would typically be of the order of microns. This allows the use of cheaper methods of fabrication for several components in the fuel cell assembly. The improved level of electrical contact which can result from such compliance yields improved fuel cell performance because electrical resistance of the cathode side may be much lower than with previous designs.

Either the structure or the geometry of the electrically conductive layer has to be such that oxygen containing gas can flow or diffuse through it to the cathode layer and electrolyte. Thus, the electrically conductive layer may be formed of porous silver material, or it may be in the form of, or be formed on, a separate sheet with appropriate openings formed through it, for example a mesh. Such a porous metallic material may be formed separate to the first gas separator member and to the cathode layer, or it may be applied as a layer to one or both of the first gas separator member and cathode layer, for example by screen printing, electrodeposition or sputtering techniques.

In one embodiment, the electrically conductive layer is in the form of a thin sheet, for example of about 100 to 500 $\mu$m thickness or less, of the silver material or is formed as a layer on a substrate sheet, the sheet in either case being formed with a multitude of openings therethrough which are designed in size and distribution to allow the free flow of the oxygen-containing gas from the oxygen-containing gas passages to the cathode layer. By way of example, from 40 to 70% of the overall surface area of the silver conductive layer may be open to permit the gas flow.

When the electrically conductive layer is formed on a substrate, the silver material may have a thickness of at least about 10 $\mu$m and may be formed on an expanded substrate mesh or other perforated sheet, advantageously formed of a metallic material such as stainless steel. The electrically conductive layer may have a thickness of 100 $\mu$m or more as described above, but preferably in the range about 20–50 $\mu$m. As a generality, the thickness of the substrate is not of concern, but usually it will be of the order of about 0.5 to 1.5 mm or less. A layer of alumina or other dense material, for example having a thickness in the range of about 1 to 5 $\mu$m or less, may be formed between a stainless steel substrate and the electrically conductive layer to prevent egress of chromium or other contaminants in the stainless steel. The stainless steel is preferably self-aluminising so that an alumina layer grows beneath the metallic conductive layer, but alternatively it may be of grade 446 or, for example, some other stainless steel containing low levels of aluminium such as is described below in which case any alumina or other dense layer would have to be applied.

Alternatively, for example, a mesh may be woven or otherwise formed from thread or other filaments of the silver material or of a substrate material such as one of the aforementioned stainless steels. The substrate material may be coated with the silver material before or after the mesh is formed. The thickness of the silver material may be as described in the immediately preceding paragraph.

The thickness and material of construction of each gas separator member are chosen to facilitate the transfer of heat across or along the gas separator members and away from the fuel cell. Each gas separator member may also provide the structural strength and rigidity of the fuel cell assembly.

By the present invention, the alloy of the gas separator members may be chosen to provide excellent and long term resistance to high temperature exposure in reducing and oxidising atmospheres without regard to the need to maintain electrical contact at the cathode layer interface at the operating temperature of the fuel cell assembly. Materials which develop, or which may be treated to develop, an alumina layer which inhibits or prevents the ingress of oxygen and/or the egress of elements or compounds which are deleterious to the fuel cell can be used. Thus, the choice of alloy material of the gas separator members is greatly increased, and consequently more effective, cheaper or more readily available materials may be used with advantage.

The alloy material of each gas separator member may be a traditional high temperature material such as, for example, a heat resisting steel or nickel alloy such as Haynes 230. A preferred heat resisting steel is a ferritic stainless steel treated with a coating which is conditioned to provide a protective layer of alumina on at least the cathode-facing surface or containing sufficient aluminium (usually >4.5 wt %) to be self-aluminising so as to form the layer of alumina. This layer has the effects of rendering the surface electrically insulating and largely impervious to oxygen and to any chromium-based oxide or oxyhydroxide gases. Ferritic stainless steels which need to be treated to form the alumina layer include grade 446 and a heat resistant steel containing, in wt %, Cr 26.25–28; C 0.011–0.080; Si 0.01–0.09; Mn 0.01; Ni 0.01; S 0.001–0.002; P 0.002; rare earth metal 0.01–0.15; residue iron, excluding incidental impurities any of which are at trace levels or below. The treatment will generally include introducing aluminium to the cathode-facing surface of the gas separator member by one of the many known procedures, such as aluminising or calorising, and oxidising the aluminium at the surface. The thickness of any alumina layer is preferably no more than a few microns, for example about 1 to 5 $\mu$m or less.

The oxygen-containing gas passages may be formed as channels in the cathode-facing surface of the first gas separator member, or may be formed in separate passage defining means. In the first case, the alumina layer is provided in the passages as well as on the surfaces contacting the silver or silver alloy. If there is only one fuel cell in the fuel cell assembly, or if the fuel cell is an end fuel cell in a stack of fuel cells in the assembly, the opposite side of the first gas separator member does not have to define an anode contacting surface. However, in other embodiments fuel gas passages will be defined between the opposite side of the first gas separator member and the anode layer of an adjacent fuel cell. Again, the fuel gas passages may comprise channels formed in the anode-facing surface of the first gas separator member or, for example, the fuel gas passages may be as described in our co-pending International Patent Application PCT/AU98/00437.

Similarly with the second gas separator member, the fuel gas passages may be defined in channels formed on the anode-facing surface thereof or, for example, as described in the aforementioned International patent application PCT/AU98/00437. If the fuel cell is one of several in a stack, the second gas separator member may advantageously have an alumina layer on the cathode-facing surface and a layer of electrically conductive silver material between the cathode layer of an adjacent fuel cell and the cathode-facing surface of the second gas separator member in electrical contact with said cathode layer to conduct electrical current away from the cathode layer, the electrically conductive layer being such as to permit gas in the oxygen-containing gas passages of the second gas separator member to contact the cathode layer of the adjacent fuel cell. Thus, preferably, each fuel cell assembly in a fuel cell stack is in accordance with the present invention.

The silver material conductive layer may be electrically connected to the anode side of the first gas separator member, or to an external circuit if it is a terminal or end gas separator member, via the gas separator member itself or via an independent circuit, for example an external bus bar. If the conductive layer is electrically connected via the gas separator member itself, the body of the alloy gas separator member may be electrically conductive and/or may have an electrically conductive element extending through it. The connection of the conductive layer to the independent circuit or to or through the first gas separator member may be by means of a wire or rod, preferably of thicker cross-section than the conductive layer, of a suitable material which does not act as a source of contamination of the fuel cell. This material may be silver or some other material. The wire or rod may be welded to or simply in contact with a portion of the first gas separator member which is left free of the alumina layer. The wire or rod may be welded to a further wire or other connecting link which is attached to the anode side of the first gas separator member. The connecting link should have resistance to the gaseous fuel environment on the anode side and to adverse reactions with fuel cell materials, a suitably high melting point and high electrical conductivity. A suitable metal is nickel. The connecting link or links may be passed through one or more passages in the first gas separator member and may be advantageously positioned so that the junction between the wire and rod and connecting link is located within the first gas separator member. Alternatively, the silver material conductive layer may engage the connecting link(s) directly, with the or each connecting link passing through a respective passage in the first gas separator means and preferably having a raised head on the cathode-facing surface. Thus, the connecting link may be in the form of a rivet, preferably of silver or silver coated at least on the cathode side. The or each passage through the gas separator member must be sealed to prevent the oxygen-containing gas contacting the anode side of the member and the fuel gas from contacting the cathode side of the member. A suitable insulating sealant material is a glass which is highly viscous at the operating temperature of the member.

Two embodiments of a fuel cell assembly in accordance with the present invention will now be described by way of example only with reference to the accompanying drawings in which.

Figure 1:
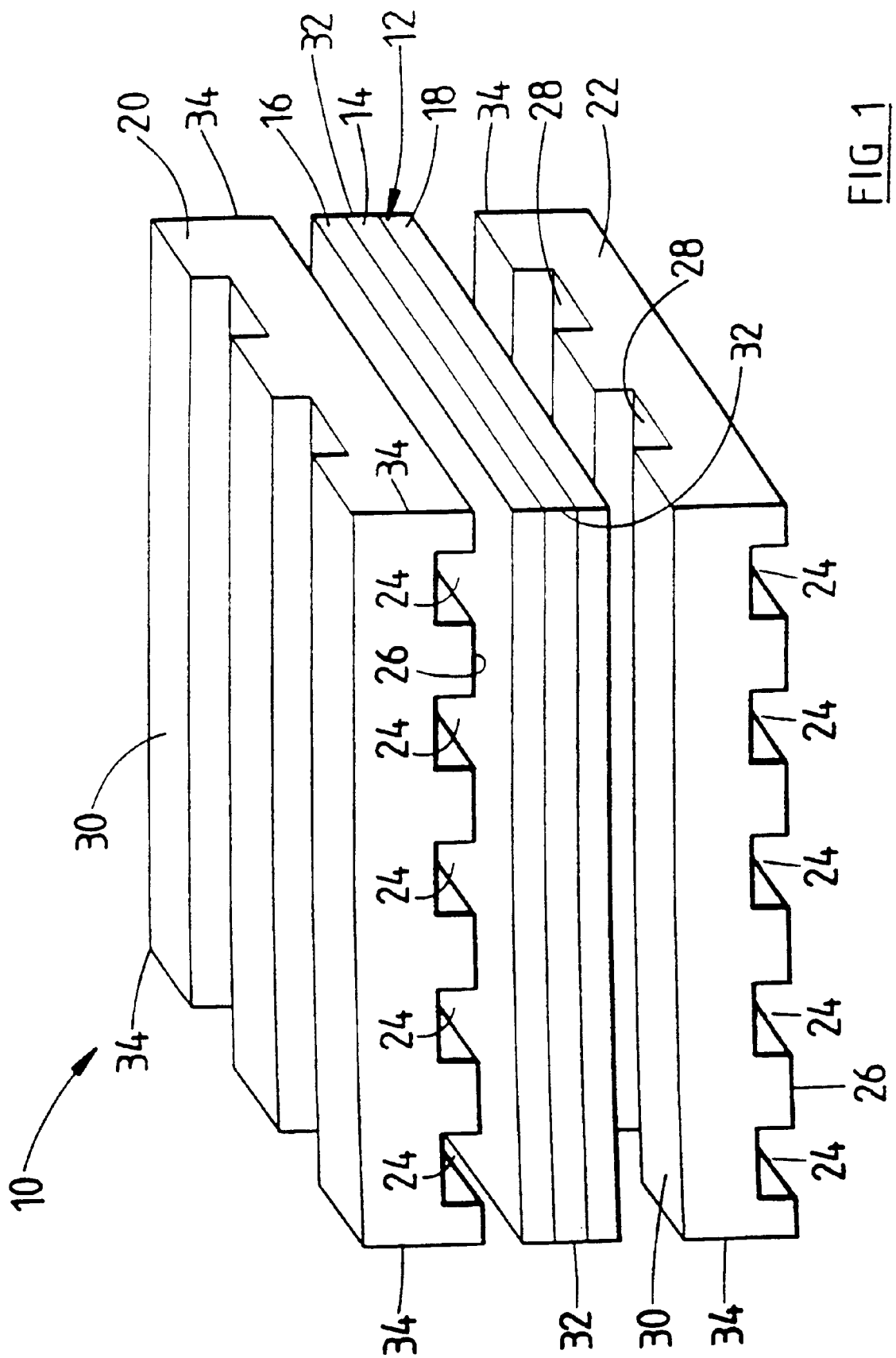
FIG. 1 is an exploded perspective of a fuel cell assembly.

The fuel cell assembly 10 shown in exploded form in FIG. 1 has a typical structure which may be used in the present invention. As illustrated, the structure is known and will therefore not be described in detail. The assembly comprises a planar fuel cell 12 comprising a solid oxide electrolyte central layer 14 with an integral anode layer 16 overlying one face of the electrolyte and an integral cathode layer 18 overlying the opposite face of the electrolyte. The electrode layers may be applied by known screenprinting techniques. The fuel cell is sandwiched between a pair of gas separator plates 20 and 22 which in use are in face to face contact with the anode 16 and cathode 18 respectively.

The gas separator plates 20 and 22 shown in FIG. 1 are identical with an array of gaseous fuel channels 24 extending across the underside 26 and an array of gaseous oxidant flow channels 28 extending across the top side 30. The channels 24 and 28 are shown extending at right angles to each other but they may extend parallel and the respective gas flow directions may then be the same or opposite depending upon the manifolding arrangements. By providing the gas flow channels on both sides, the gas separator plates 20 and 22 may be used to form a fuel cell stack in which an identical fuel cell 12 overlies the gas separator plate 20 and another identical fuel cell 12 underlies the gas separator plate 22. Further identical gas separator plates may then be placed adjacent the opposite sides of the further fuel cells, and so forth to build up a fuel cell stack of the desired number of fuel cells. The gas separator plates provided at the ends of the stack need only have one of the arrays of gas channels, gas channels 24 for the gas separator plate at the top of the stack as described and gas channels 28 for the gas separator plate at the bottom of the stack as described. Likewise in a fuel cell assembly comprising only a single fuel cell 12 the proposed gas separator plates need only have the respective array of gas channels on the face in contact with the fuel cell. These end gas separator plates are commonly termed end plates.

In use, the gaseous fuel and oxidant flows must be kept apart and suitable manifolding (not shown) is provided to ensure this. In the cross flow arrangement illustrated this is conveniently provided by an inert cylindrical or other sleeve (not shown), for example of ceramic, which extends around the fuel cell stack with its axis normal to the gas flow channels 24 and 28 and with the corners 32 of the fuel cells 12 and the corners 34 of the gas separator plates sealed in contact with the annular inner surface of the sleeve. The fuel cell assembly is completed by terminals on the top and bottom end plates for attachment of the fuel cell or fuel cell stack to an external load.

As noted already, the fuel cell assembly 10 illustrated in FIG. 1 is known and in the described embodiment the fuel cell 12 comprises a solid oxide electrolyte 14 of $Y_2O_3$-doped $ZrO_2$ as an ionic conductor while the electrodes 16 and 18 are at least primarily electronic conductors with the anode 16 comprising an $Ni/ZrO_2$ cermet and the cathode 18 comprising strontium doped lanthanum manganite (LSM).

In a variation, the fuel cell 12 may be replaced by a fuel cell in which the anode layer is the primary load bearing layer, for example as described in the aforementioned International Patent Application PCT/AU98/00437. Other features described in that International Patent Application, including the proposals for reducing the compressive load on the anode side of the fuel cells, may be adopted for use with the present invention.

Figure 2:
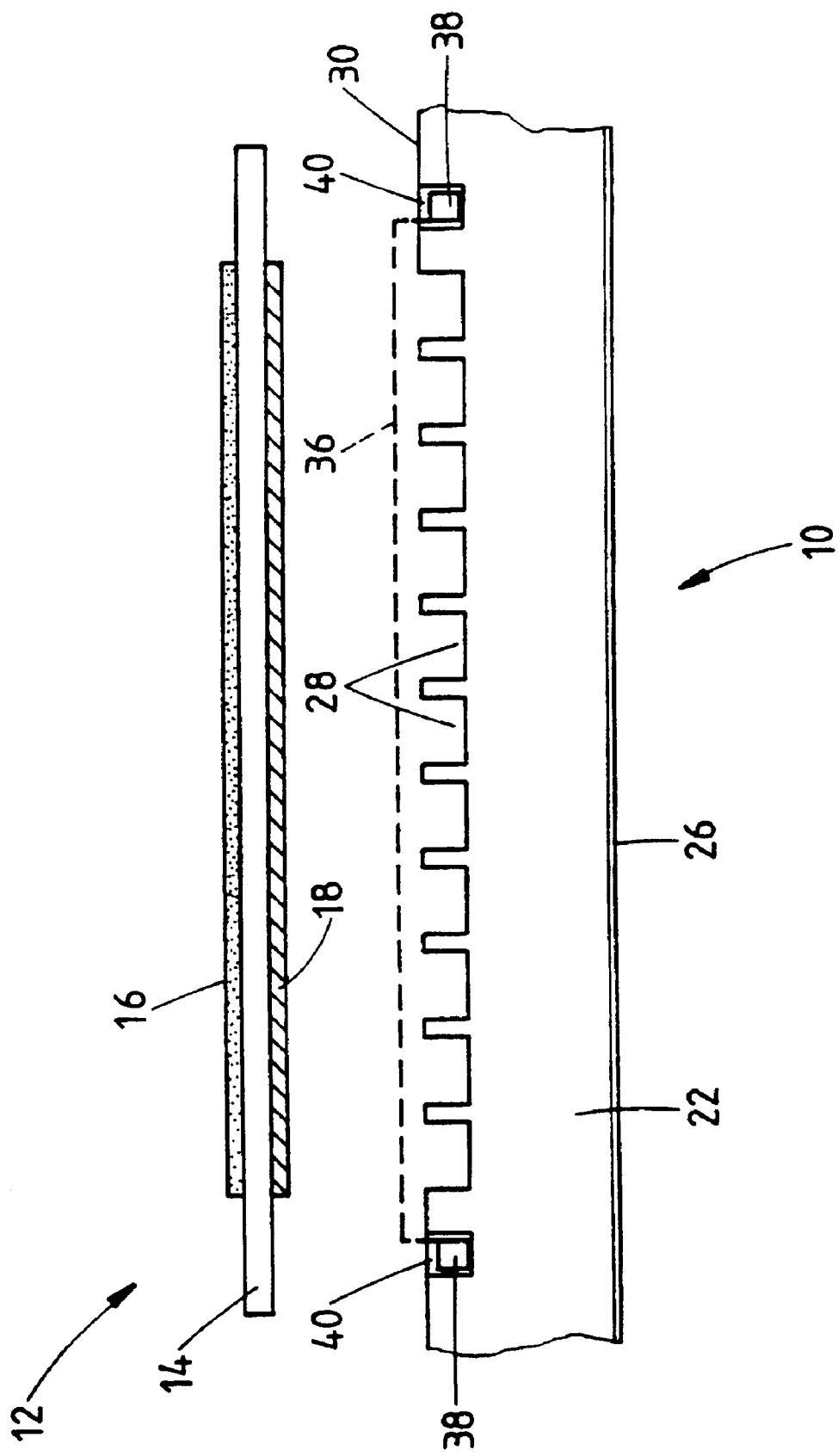
FIG. 2 is a schematic partial side elevational exploded view of a first embodiment of the fuel cell assembly.

Referring to FIG. 2, the gas separator plate 22 is formed of an electrically conductive ferritic stainless steel having a composition substantially of the grade known as 446. In accordance with the present invention, the cathode side 30 of the gas separator plate is coated with a dense layer of alumina having a thickness preferably of about 2 to about 3 μm and is therefore electrically insulating. The alumina layer extends across the outermost surface of the cathode side 30 of the gas separator plate 22 including throughout the oxygen containing gas channels 28. Alternatively a self-aluminising stainless steel may be used.

In order to provide the electrical contact between the cathode layer 18 of the fuel cell 12 and the anode side 26 of the gas separator plate 22, a layer of expanded metal silver mesh 36 having a thickness of about 100 μm extends over the cathode side 30 to be sandwiched between the cathode layer 18 and the gas separator plate 22. The mesh 36 permits oxygen-containing gas from the channels 28 to contact the cathode layer 18 and is sufficiently thin to deform under the compressive load of the assembled fuel cell assembly 10 and thereby comply to small surface irregularities in the cathode layer 18 and cathode side 30 of the gas separator plate. Thus, the electrical connection with the cathode layer 18 may be enhanced.

The silver mesh 36 is welded to or simply in electrical contact with collector rods 38 at opposed ends of the mesh which are disposed in respective grooves 40 formed in the gas separator plate 22 from the cathode side 30 through the alumina surface layer into the stainless steel substrate material, on opposed sides of the gas flow channels 28. The grooves 40 are not protected by the alumina layer. The collector rods 38 were formed of palladium but are more preferably platinum or an 80 wt % platinum 20 wt % rhodium alloy. The welds or other connections between the silver mesh and the collector rods are disposed in the grooves 40 and the grooves are sealed by means of a highly viscous glass with the collector rods 38 in electrical contact with the stainless steel substrate of the gas separator plate. The glass protects the connections between the silver and the collector rods and also protects the grooves 40 from exposure to the oxygen-containing gas. The glass may be rendered electrically conducting by loading with fine metallic powders.

Thus, the silver mesh 36 may in a multi-fuel cell stack be in contact with the anode side 26 of the gas separator plate 22. However, in the embodiments tested only a single fuel cell was used and the gas separator plate 22 must be connected to an external electrical circuit. In the embodiment tested, the gas separator plate 20 (see FIG. 1) is formed of the same ferritic stainless steel as gas separator plate 22 and has a nickel mesh layer welded to the anode side of the plate.

Figure 4:
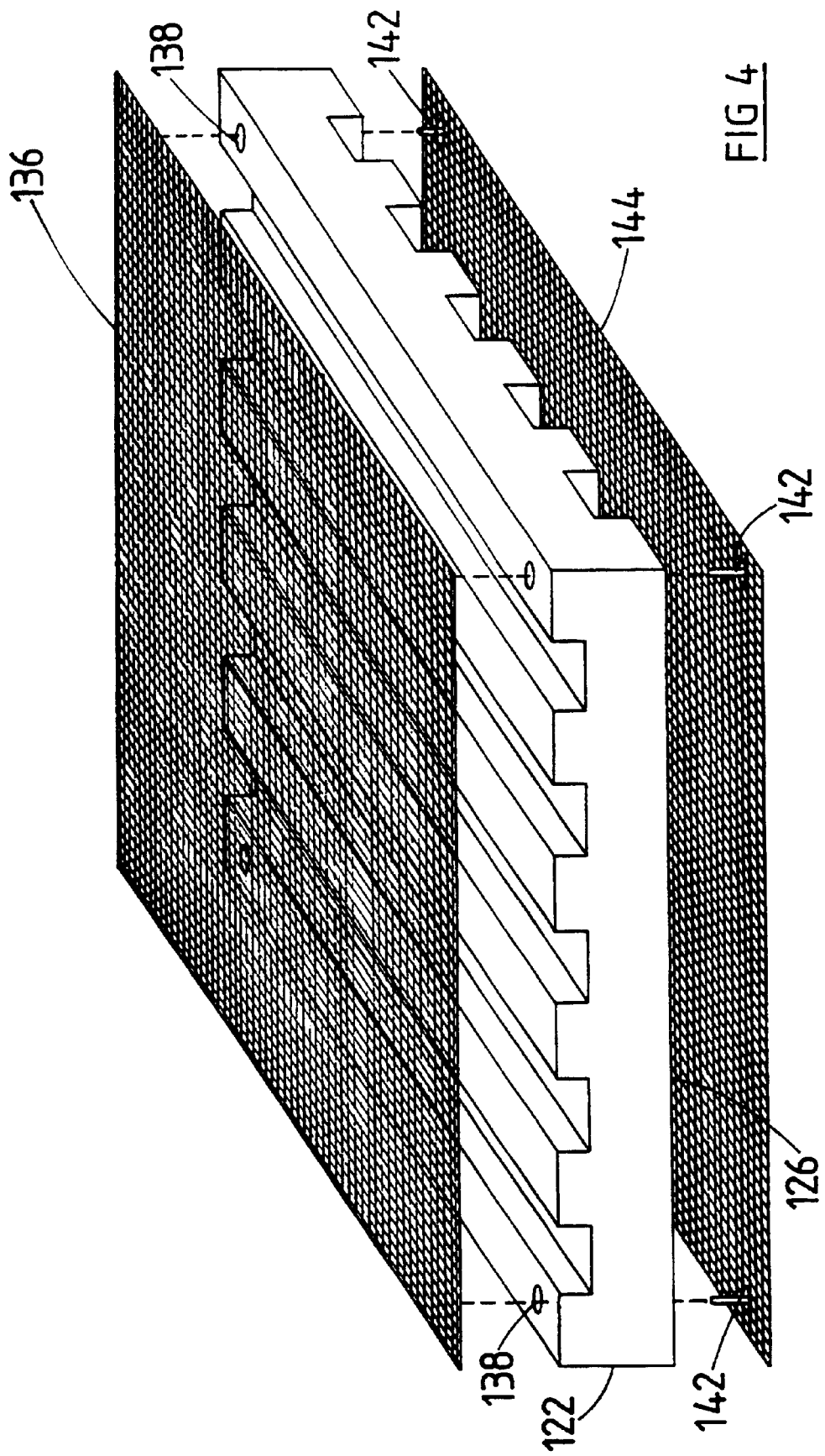
FIG. 4 is an exploded view of a second embodiment of the fuel cell assembly.

Referring to FIG. 4, a gas separator plate 122 has a construction generally the same as gas separator plate 22 shown in FIG. 2. However, a conducting layer 136 is in the form of a woven mesh made from high temperature stainless steel as described above which is silver plated. This mesh is electrically connected to the cathode side of the plate 122 by way of its corners contacting four slightly raised contacts 138. The contacts 138 are the silver plated heads of electrically conducting rivets which pass completely through the thickness of the plate 122 and therefore through an alumina layer formed on the cathode side of the plate. On the anode-facing side 126, the opposite-facing rivet heads 142 are nickel or nickel plated and these clamp a nickel or nickel plated conducting mesh 144 to the anode-facing side of the plate 122. In operation of the fuel cell shown in FIG. 4 the mesh 144 is pressed against the anode side of a fuel cell to make electrical contact therewith. The conduction path thus extends from the cathode side of a first fuel cell to mesh 136, then through the gas separator plate 122 via the four rivets to mesh 144, and from there to the anode side of a second fuel cell. It will be appreciated that this connection path is independent of the existence of the alumina layer on the cathode-facing surface of the gas separator plate.

Sealing of the annular clearance between the rivets and holes in the connector plate 122 through which the rivets pass may be accomplished by the rivet heads 138 bearing tightly on the cathode-facing side of plate 122. In addition or alternatively the clearance between the rivets and holes may be sealed with a glass which is viscous at the operating temperature of the gas separator plate.

EXAMPLES

The following examples are given for illustrative purposes only and should not be construed as limiting the invention.

Example 1.

Figure 3:
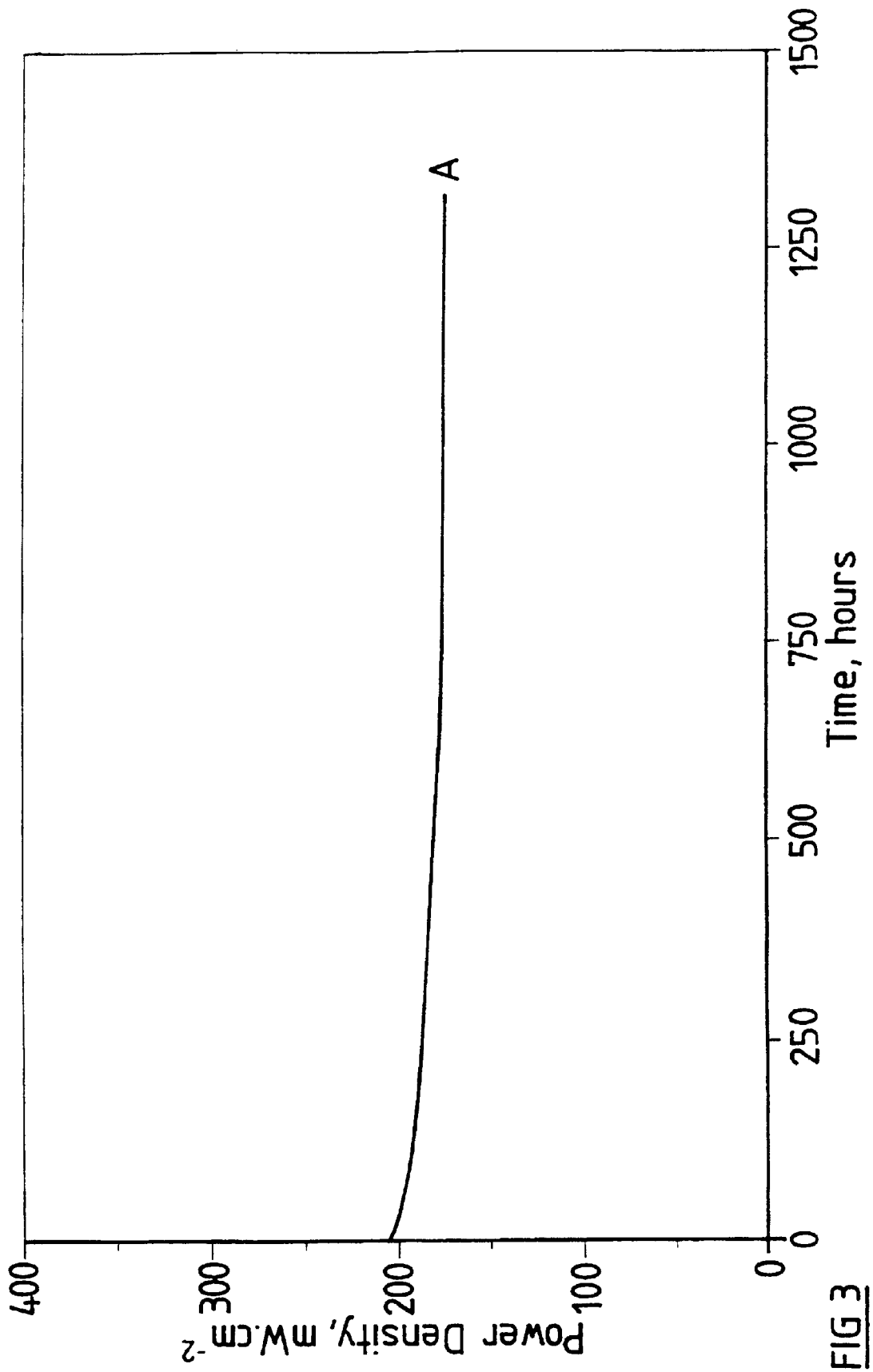
FIG. 3 is a performance graph of power density over time for a test on a fuel cell assembly as shown in FIG. 2 when operated at 800° C.

The fuel cell described with reference to FIG. 2 was tested in a single cell stack and performed at a high level of efficiency for long periods of time. The fuel cell was run for more than 1300 hours at temperatures of 750, 800, 850 and 900° C. at current densities of 250 to 600 mA/cm². The fuel gas was moist hydrogen and the cathode side gas was dry air. The fuel cell experienced low levels of degradation. FIG. 3 illustrates this for the test run at 800° C.

Example 2.

Figure 5:
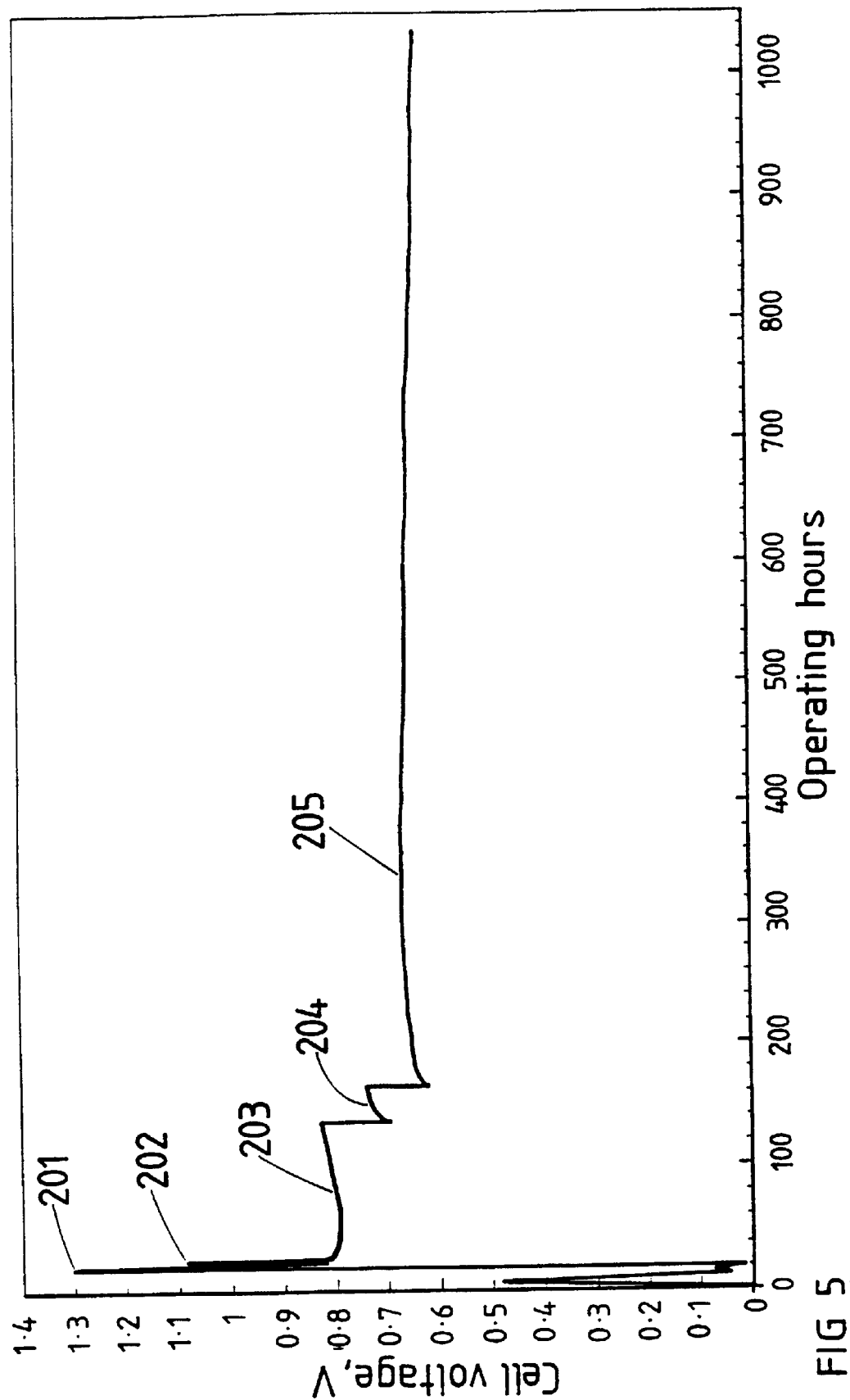
FIG. 5 is a plot of performance showing cell voltage over time for a fuel cell assembly substantially as described with reference to FIG. 4.

FIG. 5 is a plot showing the performance of a single cell stack as described with reference to FIG. 4. The stack was operated at 800° C. with a fuel gas of wet hydrogen (4% $H_2O$ and 96% $H_2$) and air as the oxidant gas.

During the start-up phase at period 201 the open cell voltage was 1.31 V in dry hydrogen and for period 202 it was 1.09 V in the 4% wet hydrogen. The stack operated in subsequent period 203 (for approx 100 hours) at 100 mA/cm², for period 204 (approx 35 hours) at 150 mA/cm² and for period 205 (approx 850 hours) at 200 mA/cm². The maintenance of a cell voltage above 0.63 V, and the low rate of degradation in performance over the latter portion of period 203, shows an improved performance over alternative constructions.

Those skilled in the art will appreciate that the invention described herein is susceptible to variations and modifications other than those specifically described. It is to be understood that the invention includes all such variations and modifications which fall within its spirit and scope.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A solid oxide fuel cell assembly comprising a planar fuel cell having a solid oxide electrolyte layer with an anode layer on one side and a cathode layer on the other side, the fuel cell being disposed between a first thermally conductive high temperature-resisting metal alloy gas separator member adjacent the cathode layer and a second thermally conductive high temperature-resisting metal alloy gas separator member adjacent the anode layer, oxygen containing gas passages being provided between the cathode layer and the first gas separator member and fuel gas passages being provided between the anode layer and the second gas separator member, wherein a layer of electrically conductive material is provided between the cathode layer and the first gas separator member in electrical contact with the cathode layer to conduct electrical current away from the cathode layer, said electrically conductive layer being adapted to permit the oxygen-containing gas in the oxygen-containing gas passages to contact the cathode layer and comprising silver, and wherein the first gas separator member has a layer of alumina adjacent the layer of electrically conductive material.

2. A fuel cell assembly according to claim 1 wherein the silver is present as an alloy.

3. A fuel cell assembly according to claim 1 wherein the silver is present as an intermetallic compound.

4. A fuel cell assembly according to claim 1 wherein the silver is present as a composite material with a non-metal.

5. A fuel cell assembly according to claim 1 wherein the electrically conductive layer consists of at least substantially pure silver.

6. A fuel cell assembly according to claim 1 wherein the electrically conductive layer is in the form of a mesh of the silver material.

7. A fuel cell assembly according to claim 6 wherein the mesh is in a form selected from the group consisting of woven and expanded metal.

8. A fuel cell assembly according to claim 1 wherein the electrically conductive layer is applied as a porous coating to one or both of the first gas separator member and the cathode layer.

9. A fuel cell assembly according to claim 1 wherein the electrically conductive material is applied as a coating to a substrate disposed between the first gas separator member and the cathode layer.

10. A fuel cell assembly according to claim 9 wherein the substrate is a mesh in a form selected from the group of expanded metallic material and woven.

11. A fuel cell assembly according to claim 9 wherein the substrate is stainless steel.

12. A fuel cell assembly according to claim 11 which includes a layer of alumina between the stainless steel of the substrate and the coating.

13. A fuel cell assembly according to claim 9 wherein the coating has a thickness in the range of about 20–50 $\mu$m.

14. A fuel cell assembly according to claim 1 wherein the first and second gas separator members are formed of stainless steel.

15. A fuel cell assembly according to claim 14 wherein the stainless steel is a self-aluminizing stainless steel and the layer of alumina is formed from the self-aluminizing stainless steel of the first gas separator member.

16. A fuel cell assembly according to claim 1 wherein the thickness of the alumina layer is up to about 5 $\mu$m.

17. A fuel cell assembly according to claim 1 wherein the electrically conductive silver material is electrically connected to an anode side of the first gas separator member through the gas separator member.

18. A fuel cell assembly according to claim 17 wherein at least one conductive connecting link through the first gas separator member is connected to the electrically conductive silver material.

19. A fuel cell assembly according to claim 17 wherein at least one conductive connecting link through the first gas separator member has a raised head on the cathode side of said separator member and the electrically conductive layer abuts the or each raised head.

20. A fuel cell stack comprising a plurality of fuel cell assemblies according to claim 1 superposed one upon another, wherein the first gas separator member of one fuel cell assembly is the second gas separator member of a first adjacent fuel cell assembly and the second gas separator member of said one fuel cell assembly is the first gas separator member of a second adjacent fuel cell assembly on the opposite side of the one fuel cell assembly to the first adjacent fuel cell, assembly.

* * * * *